United States Patent
Park et al.

(10) Patent No.: US 8,223,784 B2
(45) Date of Patent: Jul. 17, 2012

(54) WIRELESS SENSOR NETWORK HAVING HIERARCHICAL STRUCTURE AND ROUTING METHOD THEREOF

(75) Inventors: Hyeon Park, Daejeon (KR); Young Hwan Ham, Daejeon (KR); Sang Joon Park, Daejeon (KR); Jeong Man Woo, Daejeon (KR)

(73) Assignees: Electronics and Telecommunications Research Institute, Daejeon (KR); Fumate Co., Ltd, Daejeon (KR)

( * ) Notice: Subject to any disclaimer, the term of this patent is extended or adjusted under 35 U.S.C. 154(b) by 451 days.

(21) Appl. No.: 12/256,937

(22) Filed: Oct. 23, 2008

(65) Prior Publication Data
US 2009/0154395 A1 Jun. 18, 2009

(30) Foreign Application Priority Data
Dec. 17, 2007 (KR) .................. 10-2007-0132708

(51) Int. Cl.
H04L 12/28 (2006.01)
H04L 12/56 (2006.01)
H04W 4/00 (2009.01)
H04W 36/00 (2009.01)
(52) U.S. Cl. ......... 370/406; 370/328; 370/394; 455/442
(58) Field of Classification Search .......... 370/238–254, 370/328–351, 401–408; 455/63–67, 442–455; 709/220–223, 236–241
See application file for complete search history.

(56) References Cited

U.S. PATENT DOCUMENTS

| 7,106,742 | B1 * | 9/2006 | Frisch et al. ................. 370/394 |
| 7,142,548 | B2 * | 11/2006 | Fong et al. ................. 370/395.4 |
| 7,161,926 | B2 * | 1/2007 | Elson et al. .................. 370/338 |
| 7,729,285 | B2 * | 6/2010 | Yoon ............................ 370/254 |
| 7,765,335 | B2 * | 7/2010 | Iima ............................. 710/19 |
| 2006/0223585 | A1 * | 10/2006 | Legg ............................ 455/560 |
| 2007/0019604 | A1 * | 1/2007 | Hur et al. .................... 370/347 |
| 2007/0064625 | A1 * | 3/2007 | Lim et al. .................... 370/254 |
| 2007/0155388 | A1 * | 7/2007 | Petrovic et al. ............. 455/442 |
| 2007/0223497 | A1 * | 9/2007 | Elson et al. ................. 370/400 |
| 2008/0109536 | A1 * | 5/2008 | Hong et al. ................. 709/220 |
| 2008/0309480 | A1 * | 12/2008 | Youn et al. ............... 340/539.3 |
| 2009/0059842 | A1 * | 3/2009 | Maltseff et al. ............. 370/328 |
| 2009/0092112 | A1 * | 4/2009 | Kim et al. ................... 370/338 |

(Continued)

FOREIGN PATENT DOCUMENTS

| KR | 1020010012520 A | 2/2001 |
| KR | 1020060065971 A | 6/2006 |
| KR | 1020070072443 A | 7/2007 |

OTHER PUBLICATIONS

Hyeon Park et al. The Second International Workshop on Broadband and Wireless Computing, Communication and Applications, "Reliable Routing for Real-Time Services in Large Scale Wireless Sensor Networks", Dec. 3-5, 2007, Jakarata, Indonesia, pp. 1-7.

*Primary Examiner* — Man Phan
(74) *Attorney, Agent, or Firm* — Kile Park Goekjian Reed & McManus PLLC

(57) ABSTRACT

A network having a hierarchical structure includes a plurality of clusters. Each of the clusters includes a plurality of nodes and a cluster head connected to the nodes in a mesh format. Each of the nodes is connected to other clusters via the cluster head.

7 Claims, 5 Drawing Sheets

U.S. PATENT DOCUMENTS

2009/0154407 A1* 6/2009 Jeong et al. .................... 370/329
2009/0154482 A1* 6/2009 Ham et al. ..................... 370/408
2009/0207769 A1* 8/2009 Park et al. ..................... 370/311
2009/0285140 A1* 11/2009 Kim et al. ..................... 370/311
2010/0190504 A1* 7/2010 Lee et al. ...................... 455/450
2010/0272033 A1* 10/2010 Fwu et al. ..................... 370/329

* cited by examiner

FIG. 4

| 401 | 402 | 403 | 404 | 405 | 406 | 407 | 408 | 409 | 410 | 411 | 412 |
|---|---|---|---|---|---|---|---|---|---|---|---|
| ID (NODE ADDRESS) | PARENT | COST | CHILD | MISSED | RECEIVED | lastSeqno | FLAG | SendEst | RcvEst | HOP | FCS |
| B | | | | | | | | | | | |
| C | | | | | | | | | | | |
| D | | | | | | | | | | | |

WIRELESS SENSOR NETWORK HAVING HIERARCHICAL STRUCTURE AND ROUTING METHOD THEREOF

CROSS-REFERENCE TO RELATED PATENT APPLICATIONS

This application claims the benefit of Korean Patent Application No. 10-2007-0132708, filed on Dec. 17, 2007, in the Korean Intellectual Property Office, the disclosure of which is incorporated herein in its entirety by reference.

BACKGROUND OF THE INVENTION

1. Field of the Invention

The present invention relates to a wireless sensor network (WSN), and more particularly, to a wireless sensor network having a hierarchical structure guaranteeing end-to-end delay considering scalability of a network, and a routing method thereof.

2. Description of the Related Art

A WSN generally includes a large scale amount of sensor nodes which are densely distributed in a sensor field. In a large scale sensor network, a delay in data delivery may cause a critical result to an application sensitive to the such delays. In actual real-time services such as a military application, a target must be quickly recognized and information on the target must be delivered to a command post located at a remote place.

In order to embody real-time services such as in a battle field application, not only extensibility of a large scale network but also a delay guarantee of service must be taken into consideration. One method of minimizing delay uses a hierarchical structure and a short hop count. However, even when the hop count is short, if the quality of a link is not good, the delay may be further extended due to continuous retransmission. When the quality and reliability of the hierarchical structure and link are guaranteed, a delay guarantee of real-time service can be processed.

In the existing routing methods, Mint routing measures the quality of a link using a routing metric. The Mint routing uses an exponentially weighted moving average (EWMA) method of calculating values of a newly expected link quality and a previously expected link quality using a weight control. However, since the Mint routing uses a nonlinear link expectation, it is not sufficient to determine a routing path having superior link quality information along the path, so meaning that there is a problem in routing stability. The determination of the route for the next hop is made according to the aggregate of quality of the links flowing along different paths. That is, the determination of the route for the next hop signifies the route on the path for the next hop selection, not just the link of the next hop.

As described above, it is problematic to use the Mint routing metric for the real-time application because it cannot sufficiently reflect the quality and status of the current link. Although there are lots of lossy links in view of the overall sensor network, a loss rate dynamically varies according to environmental elements. The link-level retransmission is unreliable and each hop requires one or more retransmissions to compensate for a lossy channel. This may lead to data delivery delay in the real-time service.

SUMMARY OF THE INVENTION

To solve the above and/or other problems, the present invention provides a routing method performed in consideration of scalability of a network, guaranteeing an end-to-end delay by allowing a network to have a hierarchical structure, and performed in consideration of information on neighbor nodes when the next hop is selected for routing in the above network.

According to an aspect of the present invention, a network having a hierarchical structure comprises a plurality of clusters, each cluster comprising a plurality of nodes and a cluster head connected to the nodes in a mesh format. Each of the nodes is connected to other clusters via the cluster head.

According to another aspect of the present invention, a routing method of setting a path from a current node to a target node in a network having a hierarchical structure comprises receiving routing information including link quality information and status information of neighbor nodes of the current node, selecting a node that maximizes quality of a path from each of the neighbor nodes to the target node using the link quality information and the status information, and flooding a routing entry table using the selected node as a parent node, to the neighbor nodes.

BRIEF DESCRIPTION OF THE DRAWINGS

The above and other features and advantages of the present invention will become more apparent by describing in detail exemplary embodiments thereof with reference to the attached drawings in which:

FIG. 4 illustrates the structure of a routing entry table possessed by each node for data flooding of FIG. 3;

DETAILED DESCRIPTION OF THE INVENTION

Figure 1:
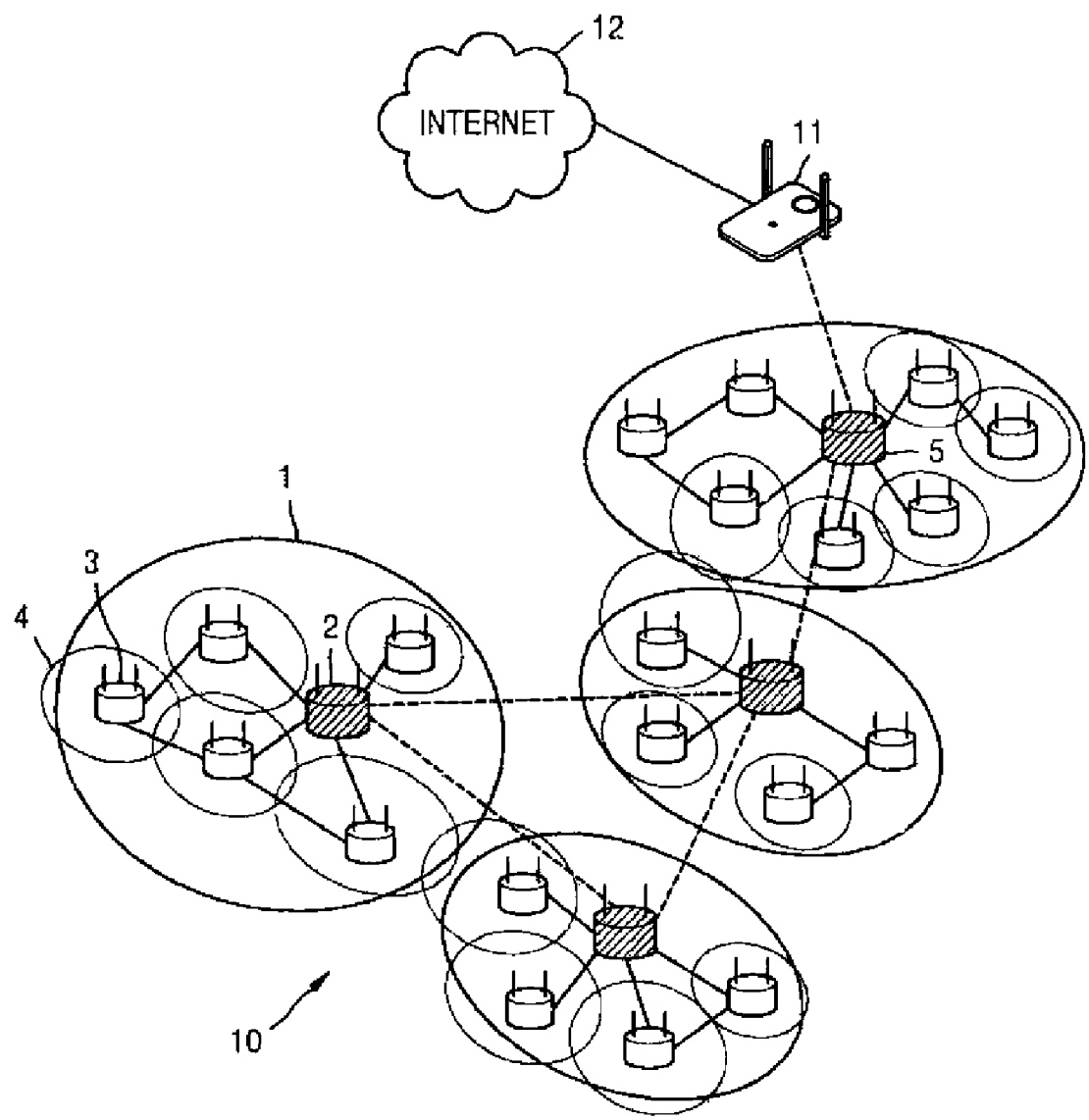
FIG. 1 illustrates a network having a hierarchical structure according to an embodiment of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIG. 1 illustrates a network having a hierarchical structure according to an embodiment of the present invention. Referring to FIG. 1, a sensor network 10 is connected to an external network such as the Internet 12 via a gateway 11. The sensor network 10 includes a plurality of clusters 1 and each of the clusters 1 includes a cluster head 2 and a plurality of sensor nodes 3. Reference numeral 4 denotes a coverage of each of the sensor nodes 3. The sensor network 10 is connected to the gateway 11 via a sink node 5.

The sensor node 3 includes a sensor (not shown) and collects information using the sensor. The cluster head 2 is connected to each of the sensor nodes 3 in the cluster 1. The cluster head 2 processes, filters, and synthesizes the collected information to reduce a possibility of misinformation of the information collected from each of the sensor nodes 3 and delivers the processed information to the sink node 5, or delivers information of the sink node 5 or another cluster to each of the sensor nodes 3 in the cluster 1 to which the cluster head 2 belongs. The sink node 5 operates as the cluster head 2 of a cluster, for example, the cluster 1, as shown in FIG. 1, and is connected to the gateway 11 when data of the sensor network 10 is delivered to the external network 12.

The cluster head 2 or the sink node 5 of the sensor network 10 is self-configured to work as the sensor node 3 or the cluster head 2 in order to provide real-time service. The sensor node 3 is connected to other sensor nodes in the cluster 1 in a mesh network and delivers the collected information to the mesh network. The cluster heads 2 are connected by the mesh network. The gateway 11 delivers the information received from the sink node 5 to the external network such as the Internet 12, that is, the real-time information is delivered to a task manager at a remote place.

Figure 2:
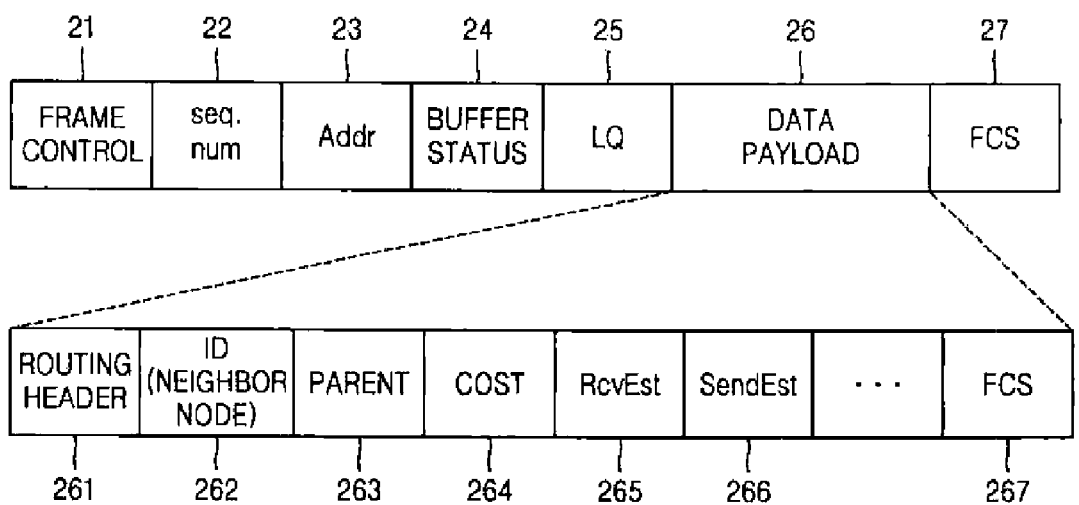
FIG. 2 illustrates the structure of a message sent and received to obtain-que information and link information between sensor nodes of FIG. 1.

FIG. 2 illustrates the structure of a message sent and received to obtain que information and link information between the sensor nodes 3 of FIG. 1. The formats of messages sent and received between nodes are the same. Referring to FIG. 2, the sent/received message includes a frame control field 21, a sequence number field 22, an address field 23, a buffer status field 24, a link quality (LQ) field 25, a data payload field 26, and a frame check sequence (FCS) field 27.

The buffer status field 24 indicates a degree of a buffer usage which shows a data transmission ability of a node. Thus, the degree of the buffer usage is a parameter of the transmission delay guarantee.

The link quality field 25 is a value indicating the size of energy in a frequency range of a channel such as a received signal strength indicator (RSSI) or a link quality indicator, which represents the strength of a received signal.

The data payload field 26 includes a routing header field 261, an identification (ID) field 262, a parent field 263, a cost field 264, an RcvEst field 265, a SendEst field 266, and a frame check sequence (FCS) field 267. The ID field 262 indicates the ID of a neighbor node. The parent field 263 has the ID of a higher node. The cost field 264 signifies a metric value from the sink node 5 to itself. The RcvEst field 206 indicates a value of the link quality estimated based on messages received from a counter neighbor node for a predetermined period. The SendEst field 207 is a value of the link quality estimated based on the message sent to a counter node.

Figure 3:
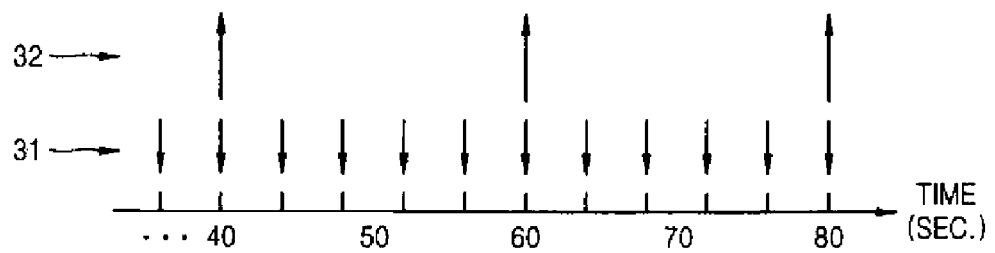
FIG. 3 illustrates a cost determination process to be written to a cost field of FIG. 2.

FIG. 3 illustrates a cost determination process to be written to the cost field 264 of FIG. 2. To determine a cost of a link, each sensor node 3 periodically sends a message to its neighbor nodes. As shown in FIG. 3, messages 31 are sent 5 times every 20-seconds and five messages are received every 20-seconds from the counter neighbor nodes. The cost of a link is calculated based on information on the 5 times of message sending/receiving.

An expected number of transmissions of links according to a path is used as a cost metric. That is, an optimal path is a path that can minimize the number of packet transmissions in a multi-hop from the current node to a target node. In other words, the optimal path means a path in which retransmission is minimized because reliability of links on the path is high.

When the calculation of a cost is completed, a node having the least cost is selected as a parent node and routing entry information including this information is flooded to the neighbor nodes (32). The term "flood" signifies that information is transmitted to all neighbor nodes connected to the current sensor node 3. The parent node may be another sensor node or cluster head.

FIG. 4 illustrates the structure of a routing entry table possessed by each node for the data flooding 32 of FIG. 3. Each node possesses routing information about neighbor nodes in its own routing entry.

Referring to FIG. 4, a routing entry includes an ID field 401, a parent field 402, a cost field 403, a child field 404, a missed field 406, a received field 406, a last sequence number (lastSeqno) field 407, a flags field 408, a SendEst field 409, an RcvEst field 410, a hop field 411, and an FCS field 412. The ID field 401 includes IDs of neighbor nodes of the current node. The routing entry information keeps information on the neighbor nodes only.

Figure 5:
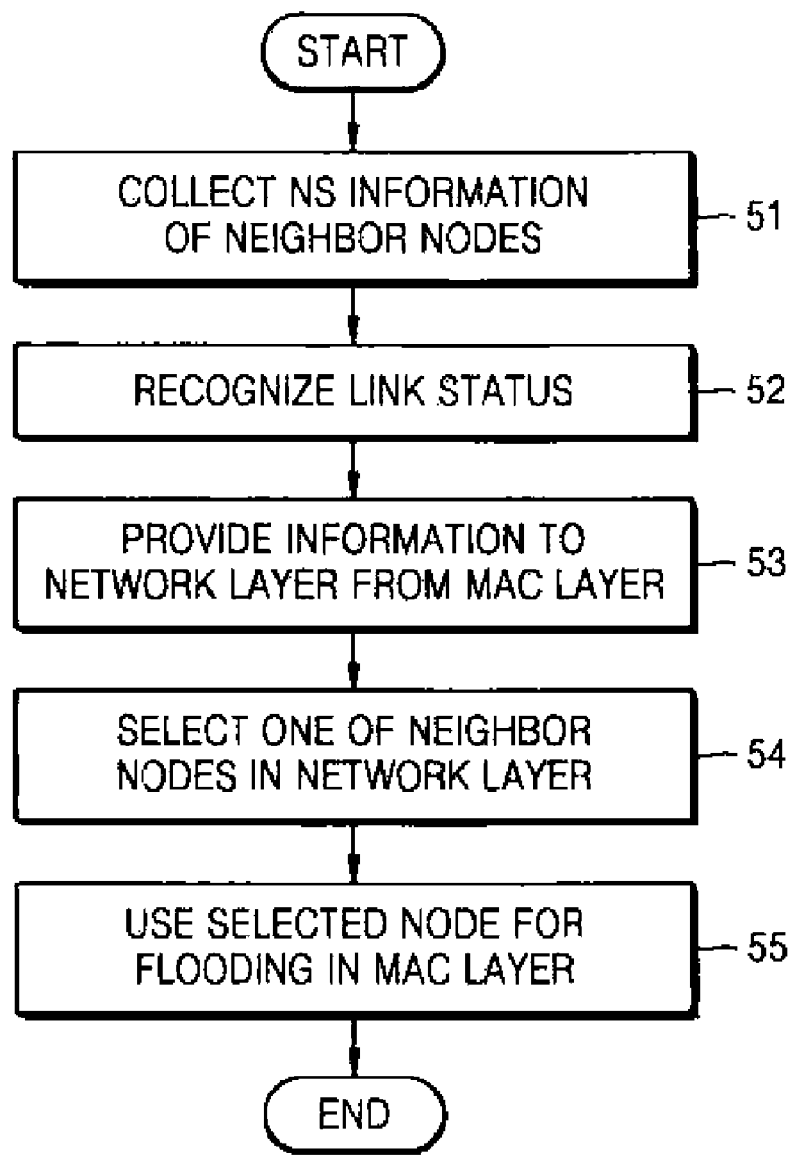
FIG. 5 is a flowchart of a process of searching for a parent node by using a cost of an actual link according to an embodiment of the present invention.

FIG. 5 is a flowchart of a process of searching for a parent node by using a cost of an actual link according to an embodiment of the present invention. In the present embodiment, in order to select a stable path when hops for routing are determined, a neighbor status (NS) is used as a routing metric in addition to the Mint metric. NS information indicates, by values, how much of a node que maintaining a forwarding packet or originating packet is used, whether the que is overflowed, or whether a link status is normal. The NS indicates the quality of a link measured at a period shorter than an exchange period in the Mint metric so that the most recent information about neighbor nodes can be obtained. Accordingly, in the present embodiment, the next hop, that is, the parent node, is determined based on not only the Mint value but also the NS value.

Referring to FIG. 5, a current node periodically receives a piggybacking message for measuring a Mint metric from 1 hop neighbor nodes to obtain NS information of the neighbor nodes (Operation 51). The NS information is a value indicating the status of a buffer, for example, how much of the overall buffer is being used. Also, the current node recognizes the link status of the neighbor node (Operation 52). The link status may be measured by the Mint metric. Next, the NS information and the information on the link status are transferred to a network layer according to a request for updating information about the neighbor nodes (Operation 53). In the network layer, the routing table is maintained and the IDs of the neighbor nodes and link quality values are managed. Also, in the network layer, one of the neighbor nodes that maximizes the link quality to a target is selected as a parent node, using the information received from a media access control (MAC) layer, and such information is notified to the MAC layer (Operation 504). In the MAC layer, the selected parent node is used in data flooding or NS information configuration for the neighbor nodes (Operation 55).

Figure 6:
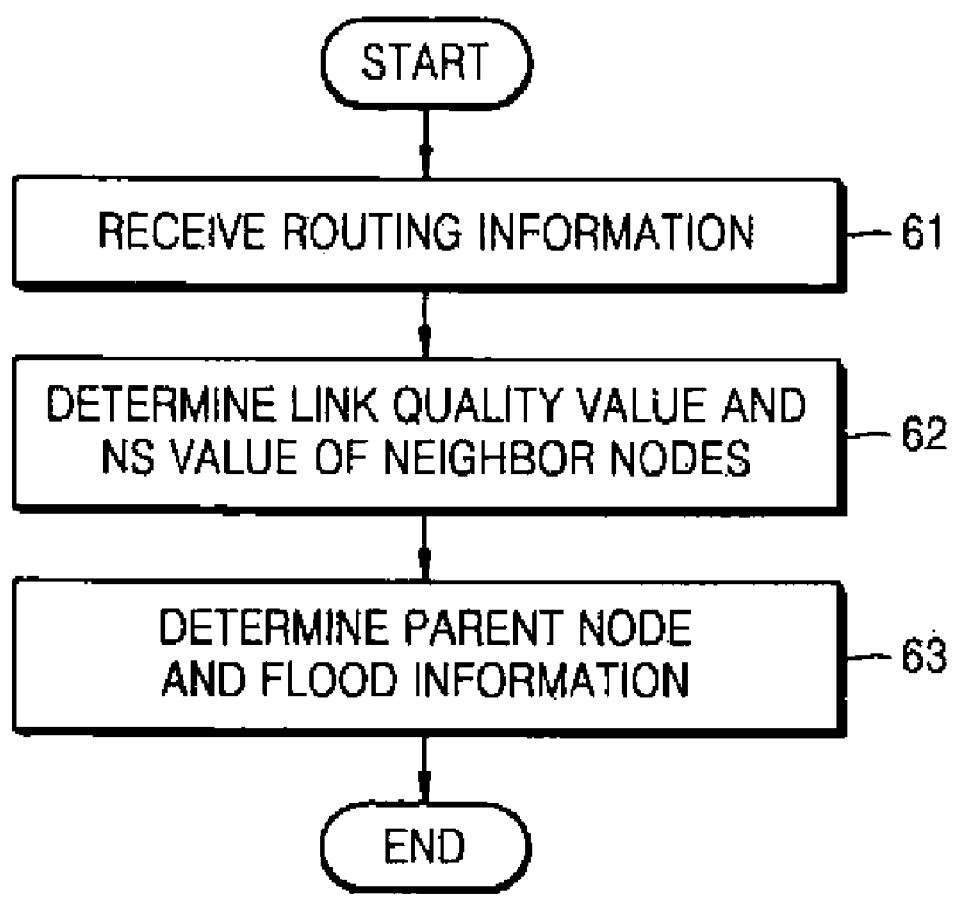
FIG. 6 is a flowchart of a routing method according to an embodiment of the present invention.

FIG. 6 is a flowchart of a routing method according to an embodiment of the present invention. First, a current node receives routing information from periodic flooding by neighbor nodes (Operation 61). Each node determines a link quality value by comparing a currently maintained link quality value and a newly received link quality value whenever a routing entry table is updated according to a timer of the node. Also, the determination of a link quality value is performed with respect to all neighbor nodes at the overall routing entry.

In the present embodiment, the NS value is determined in addition to the above-described link quality value. That is, in addition to the existing Mint metric, the NS value of a neighbor node received from the MAC layer, that is, a buffer status value, is taken into consideration (Operation 62). A parent node is determined using the routing metric and the information of the parent node determination is flooded to the neighbor nodes according to the timer (Operation 63).

As described above, according to the present invention, by configuring a network hierarchically and optimizing a cross layer, scalability of the network is embodied and end-to-end delay can be guaranteed.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A network having a hierarchical structure, the network comprising:
a plurality of clusters, each cluster comprising:
a plurality of nodes; and
a cluster head connected to the nodes in a mesh format,
wherein each of the nodes is connected to other clusters via the cluster head,
wherein each of the nodes receives messages from nodes that are subject to a next hop, each of the messages including status information of nodes subject to the next hop, the status information of the nodes indicating a degree of a buffer usage by the nodes, and
wherein each of the nodes determines the next hop using the status information of the nodes indicating a degree of a buffer usage by the nodes,
wherein the messages received by each of the nodes from nodes that are subject to a next hop are received in a MAC layer when a routing path is set, and
wherein, when the next hop is determined, a routing entry table including information about the determined hop is flooded to the other nodes in the MAC layer.

2. The network of claim 1, wherein each of the messages further includes link quality information and routing information of the nodes subject to the next hop.

3. The network of claim 2, wherein the link quality information has an amount of energy in a channel frequency range.

4. The network of claim 2, wherein the routing information of the nodes includes a parent node indicating a next hop of the node, a cost and link quality estimation values of a receiving and sending channels.

5. The network of claim 4, wherein the cost is a transmission expectation value using a message that is sent and received for a predetermined time period through a corresponding link.

6. A routing method of setting a path from a current node to a target node in a network having a hierarchical structure, the network having a plurality of clusters each having a plurality of nodes and a cluster head connected to the nodes in a mesh format, each of the nodes being connected to other clusters via the cluster head, the method comprising:
receiving routing information including link quality information and status information of neighbor nodes of the current node, wherein the status information of the nodes indicates a degree of a buffer usage by the nodes;
selecting a node that maximizes quality of a path from each of the neighbor nodes to the target node using the link quality information and the status information; and
when the node is selected, flooding a routing entry table using the selected node as a parent node, to the neighbor nodes,
wherein the routing information is received in a MAC layer when a routing path is set, and the routing entry table is flooded to the neighbor nodes in the MAC layer.

7. The routing method of claim 6, wherein the link quality information has an amount of energy in a channel frequency range.

* * * * *